Figure 4:
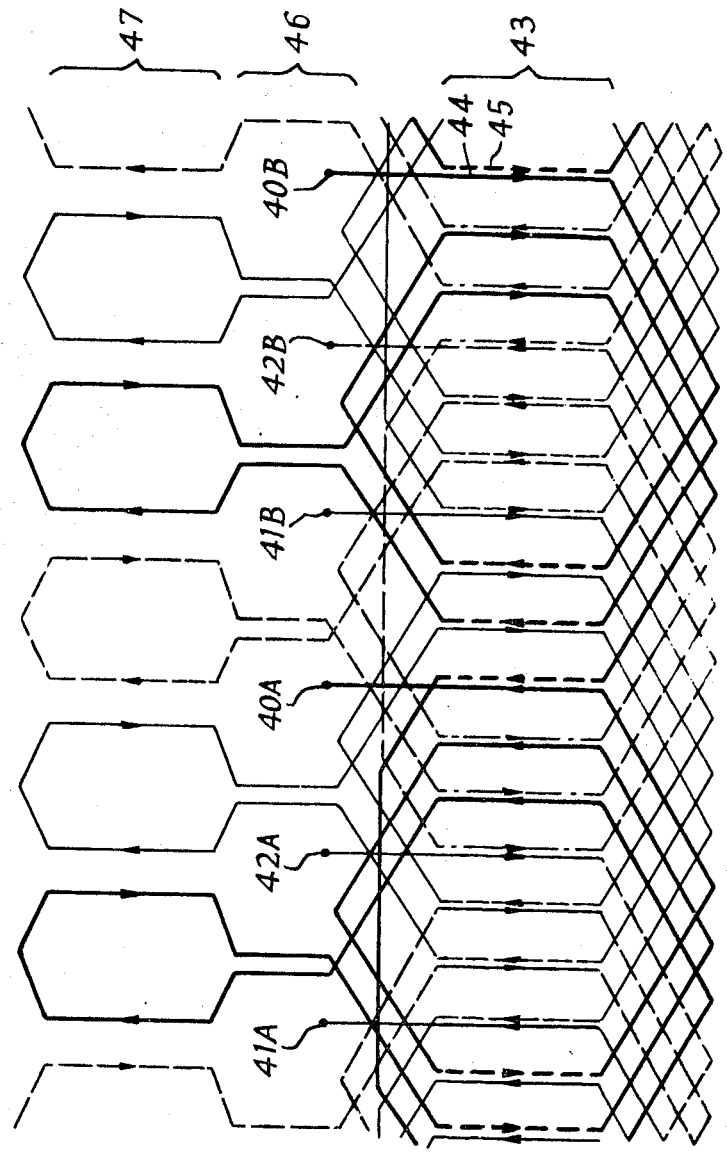

United States Patent

Hughes

[15] 3,644,766
[45] Feb. 22, 1972

[54] SYNCHRONOUS ALTERNATING CURRENT ELECTRICAL MACHINES

[72] Inventor: Austin Hughes, Fossway, Newcastle upon Tyne, England

[73] Assignee: International Research & Development Company Limited, Newcastle upon Tyne, England

[22] Filed: Aug. 7, 1970

[21] Appl. No.: 61,898

[30] Foreign Application Priority Data

Aug. 20, 1969 Great Britain......................41,630/69

[52] U.S. Cl...............................310/165, 310/40, 310/163
[51] Int. Cl.......................................................H02k 19/26
[58] Field of Search................310/165, 40, 46, 44, 160, 161, 310/165, 177, 179, 162, 169, 170, 163, 164, 211, 212, 154, 155, 207, 208, 254, 258, 52; 322/28

[56] References Cited

UNITED STATES PATENTS

| 3,242,418 | 3/1966 | Mela | 310/40 |
| 3,454,857 | 7/1969 | Farrand | 310/46 |
| 3,470,408 | 9/1969 | Lewis | 310/155 |
| 3,151,261 | 9/1964 | Lee | 310/165 |
| 2,644,905 | 7/1953 | Brueder | 310/154 |

FOREIGN PATENTS OR APPLICATIONS 1,023,930  3/1966  Great Britain........................310/169

Primary Examiner—J. D. Miller
Assistant Examiner—R. Skudy
Attorney—Kemon, Palmer & Estabrook

[57] ABSTRACT

A synchronous AC generator has a DC excited superconducting field winding on the rotor and a nonsuperconducting armature winding on the stator. The armature winding is composed of active conductors and of reactance conductors connected in series with the active conductors and disposed in a magnetic shield surrounding the active conductors whereby the magnetic shield required to prevent large fields outside the machine due to the superconducting field winding also serves to provide the reactance necessary in the reactance conductors to limit short circuit currents.

7 Claims, 4 Drawing Figures

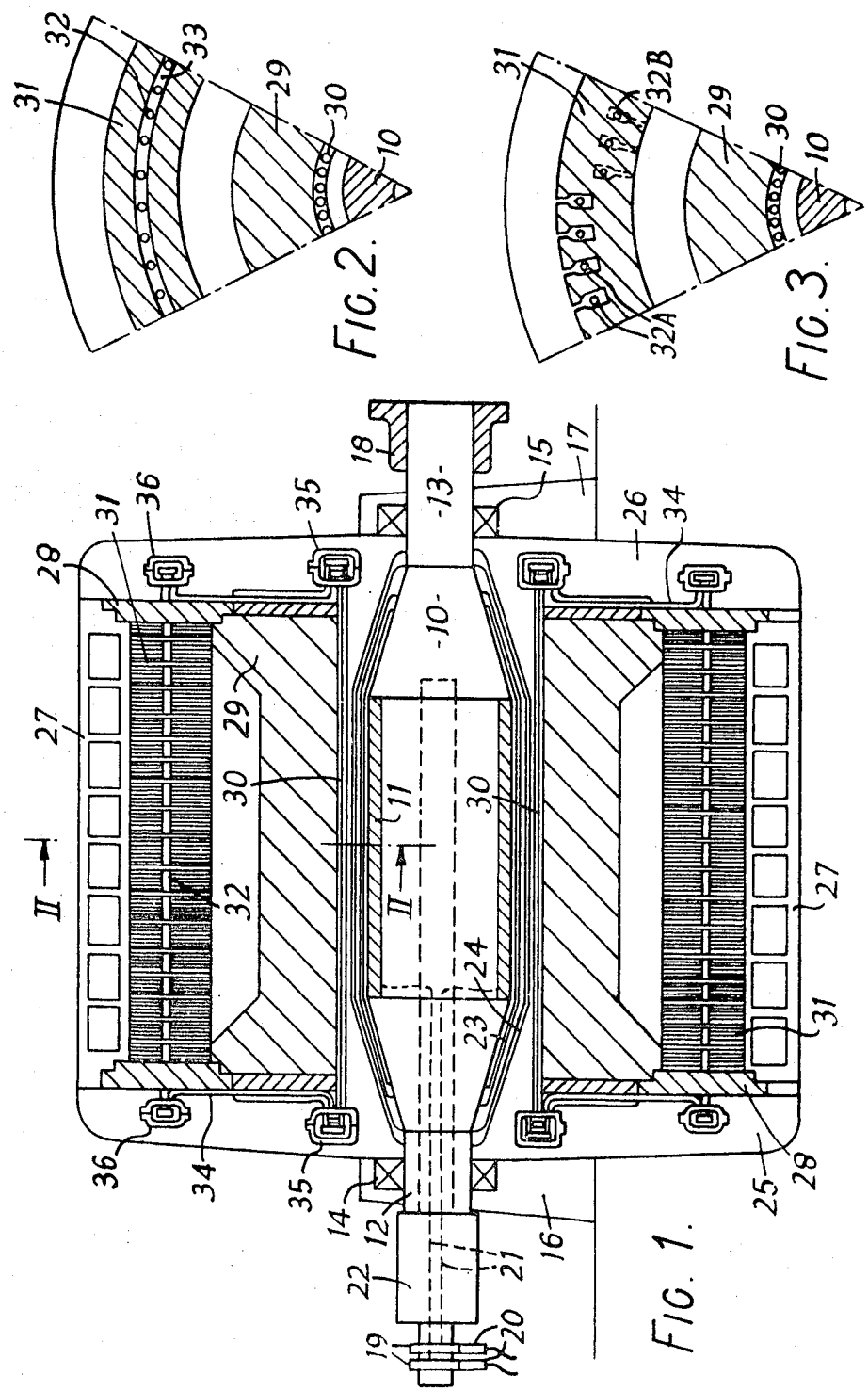

SYNCHRONOUS ALTERNATING CURRENT ELECTRICAL MACHINES

The present invention relates to a synchronous alternating current machine having a DC-excited rotor field winding of superconducting material and a stator armature winding of nonsuperconducting material.

The use of a superconducting field winding eliminates the need for a stator core of magnetic material and the stator conductors may be supported in air or in a casing of nonmagnetic material such as epoxy resin. Because of the high magnetic field intensities produced, however, it is necessary to have a magnetic shield surrounding the rotor but this is usually spaced well away from the rotor so as to lie outside the areas of high flux density.

Large machines of this kind can provide problems under short-circuit conditions as the currents flowing under such conditions may be sufficient to damage the windings severely.

Short-circuit currents can be reduced by using magnetic material such as iron in the high flux regions, but the need to use such material detracts from one of the main advantages of a superconducting winding in that a magnetic core can be dispensed with.

In accordance with the present invention the stator winding has an active portion formed by conductors supported in a nonmagnetic environment adjacent the rotor, a further portion formed by conductors located in a magnetic shield surrounding the active portion and the rotor, and end connections connecting conductors of the active and further portions in series.

The further portion of the winding associated with the magnetic material of the magnetic shield provides sufficient reactance to limit short circuit currents without the necessity of providing any additional magnetic material around the active portion of the winding. The conductors of the active portion of the winding can be carried by a casing of nonmagnetic material spaced from the magnetic shield.

The conductors of the active and further portions of the winding preferably extend parallel to the axis of the rotor and are joined by end connections extending generally radially with respect to the rotor axis. In a preferred construction the conductors of the active portion of the winding form a double-layer winding, the end connections are at one end of the machine, and the further winding portion has a number of poles differing from that of the active portion.

The conductors of the further portion can be located in slots in a laminated magnetic shield or in an annular gap between two cylinders of laminations forming the shield.

The invention will now be described in more detail with the aid of examples illustrated in the accompanying drawings, in which:

FIG. 1 is a longitudinal section of a synchronous AC machine in accordance with the invention, FIG. 2 is a partial section on the line II—II of FIG. 1, FIG. 3 is a section similar to that of FIG. 2 showing alternative arrangements of the stator winding in the magnetic shield, and FIG. 4 is a schematic winding diagram of the stator winding of the machine of FIG. 1.

The machine shown in FIG. 1 is a synchronous alternating current generator having a hollow steel rotor 10 within which is supported a direct current field winding 11 of superconducting material. The rotor 10 has stub shafts 12 and 13 at each end which are supported in bearings 14 and 15, respectively, carried by brackets 16 and 17, respectively. The stub shaft 13 has a coupling flange 18 for coupling it to a prime mover such as a turbine for driving the rotor. The stub shaft 12 carries slip rings 19 which are engaged by brushes 20 and are connected by leads 21 to the field winding 11 to supply current to the winding. A refrigerating unit 22 is also mounted on the stub shaft 12 to supply coolant at very low temperatures of a few degrees absolute to the winding 11 to maintain it in a superconducting state. The rotor 10 has a radiation shield 23 surrounding its cylindrical surface to reduce the inflow of heat to the winding. The radiation shield 23 is enclosed in a vacuum space within an outer casing 24.

The stator of the machine has end members 25 and 26 and a mild steel outer casing 27. Torque rings 28 of nonmagnetic alloy are mounted between the casing 27 and the end members 25 and 26 and an annular main body 29 also of nonmagnetic alloy is bolted to the torque rings 28. Active conductors 30 of the stator windings are carried on the inner face of the main body 29. A magnetic shield 31 of laminated construction and of hollow cylindrical form is mounted around the main body 29 between the torque rings 28. Reactance conductors 32 pass through the shield 31 and as shown in FIG. 2 lie in an annular gap 33 between two coaxial cylinders forming the shield. The reactance conductors 32 are connected in series with the active conductors 30 by means of end connections 34 which extend generally radially in a plane transverse to the axis of the rotor. The junctions between the active conductors 30 and the end connections 34 are enclosed in main water boxes 35 and the junction between the end connections 34 and the reactance conductors 32 in auxiliary water boxes 36. The water boxes 35 and 36, which are annular in form, serve to cool the conductors, which operate at or above room temperature, that is they are not superconducting.

The magnetic shield 31 shown in FIG. 2 is composed of coaxial cylinders each made up of laminations of silicon steel. The reactance conductors 32 which are located in the annular gap between the two cylinders can be embedded in epoxy resin or the like. It is also possible to support the active conductors 30 by means of members of reinforced epoxy resin instead of the body 29 of nonmagnetic alloy. These active conductors are located in a nonmagnetic environment and are spaced from the magnetic shield 31.

FIG. 3 shows alternative arrangements of the reactance conductors in slots in the magnetic shield 31. Reactance conductors 32A can be located in slots in the outer surface of the magnetic shield or reactance conductors 32B can be located in slots in the inner surface. A further alternative is to locate the conductors in drilled holes in the magnetic shield.

FIG. 4 shows the winding diagram for a three-phase winding in which the active portion is a two-pole double layer winding and the reactance portion is an eight-pole winding with only four pole-phase groups. The first phase winding is shown by a thick line extending between terminals 40A and 40B, the second phase winding by a thin line extending between terminals 41A and 41B, and the third phase winding by a broken line extending between terminals 42A and 42B. At 43 are shown the active conductors lying in pairs in slots to form the double winding. In each pair one conductor, for example the conductor 44, is shown in the manner specified above and lies over another conductor, for example the conductor 45, which is shown broken (or in the case of the third-phase winding as a chain dotted line). The end connections are shown at 46 and in this case lie at one end of the machine only. The reactance conductors are shown at 47 and it will be seen that they are connected in series with the active conductors by way of the end connections.

It will be noted that the active and reactance portions of the winding have different numbers of poles. The reactance portion is an eight-pole portion but half the pole-phase groups have been omitted, leaving only four. In omitting pole-phase groups the reactance portion must, of course, remain balanced between phases.

I claim:

1. A synchronous alternating current electrical machine comprising a rotor and a stator, a field winding of superconducting material on said rotor, means for supplying direct current to said field winding, means for maintaining said field winding at superconducting temperatures, an armature winding of nonsuperconducting material on said stator, and a magnetic shield on said stator, wherein said stator winding comprises active conductors disposed in a nonmagnetic environment adjacent the rotor, reactance conductors disposed in said magnetic shield, and end connections connecting the reactance conductors and the active conductors in series, said stator comprising nonmagnetic means supporting said active conductors and said magnetic shield surrounding said active conductors and said rotor.

2. An electrical machine as claimed in claim 1 in which the active and reactance conductors extend generally parallel to the axis of the rotor and the end connections extend in a plane transverse to said axis.

3. An electrical machine as claimed in claim 1 in which the active conductors form a double layer winding.

4. An electrical machine as claimed in claim 1 in which the portion of the armature winding formed by the reactance conductors has a number of poles different from that of the portion formed by the active conductors.

5. An electrical machine as claimed in claim 1 in which the magnetic shield comprises two coaxial cylinders of magnetic laminations having a gap therebetween and the reactance conductors are disposed in the said gap.

6. An electrical machine as claimed in claim 1 in which the magnetic shield has slots in which the reactance conductors are mounted.

7. An electrical machine as claimed in claim 1 wherein the armature winding is a three-phase winding, the active conductors extend parallel to the axis of rotation of the rotor and are arranged in pairs to form a double layer winding, the reactance conductors extend parallel to the axis of rotation of the rotor and the end connections are disposed at one end of the armature winding and so connect the active and reactance conductors in series that the portions of the winding formed by the active and reactance conductors have different numbers of poles.

* * * * *